July 29, 1958

F. P. SURY 2,844,874

PIPE MARKING DEVICE

Filed Aug. 9, 1956

Francis P. Sury
INVENTOR.

July 29, 1958 F. P. SURY 2,844,874
PIPE MARKING DEVICE
Filed Aug. 9, 1956 2 Sheets-Sheet 2

Francis P. Sury
INVENTOR.

BY *Clarence A. O'Brien*
*and Harvey B. Jackson*
Attorneys 2,844,874

PIPE MARKING DEVICE

Francis P. Sury, Glen Dale, W. Va.

Application August 9, 1956, Serial No. 603,109

3 Claims. (Cl. 33—21)

This invention relates to improvements in devices for marking pipes and is an improvement over my earlier Patent No. 2,677,181.

An object of the present invention is to provide an improved device for scribing pipes or other curved surfaces, the construction of the device being such that the scriber always follows the contour of the curved surface.

A further object of the invention is to provide a device of the nature described wherein it may be produced with a minimum of difficulty and expense, the improvements being directed largely toward providing a practical device that will be able to be produced at such a cost as to be attractive to mechanics or other workmen having need for such an instrument or tool.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
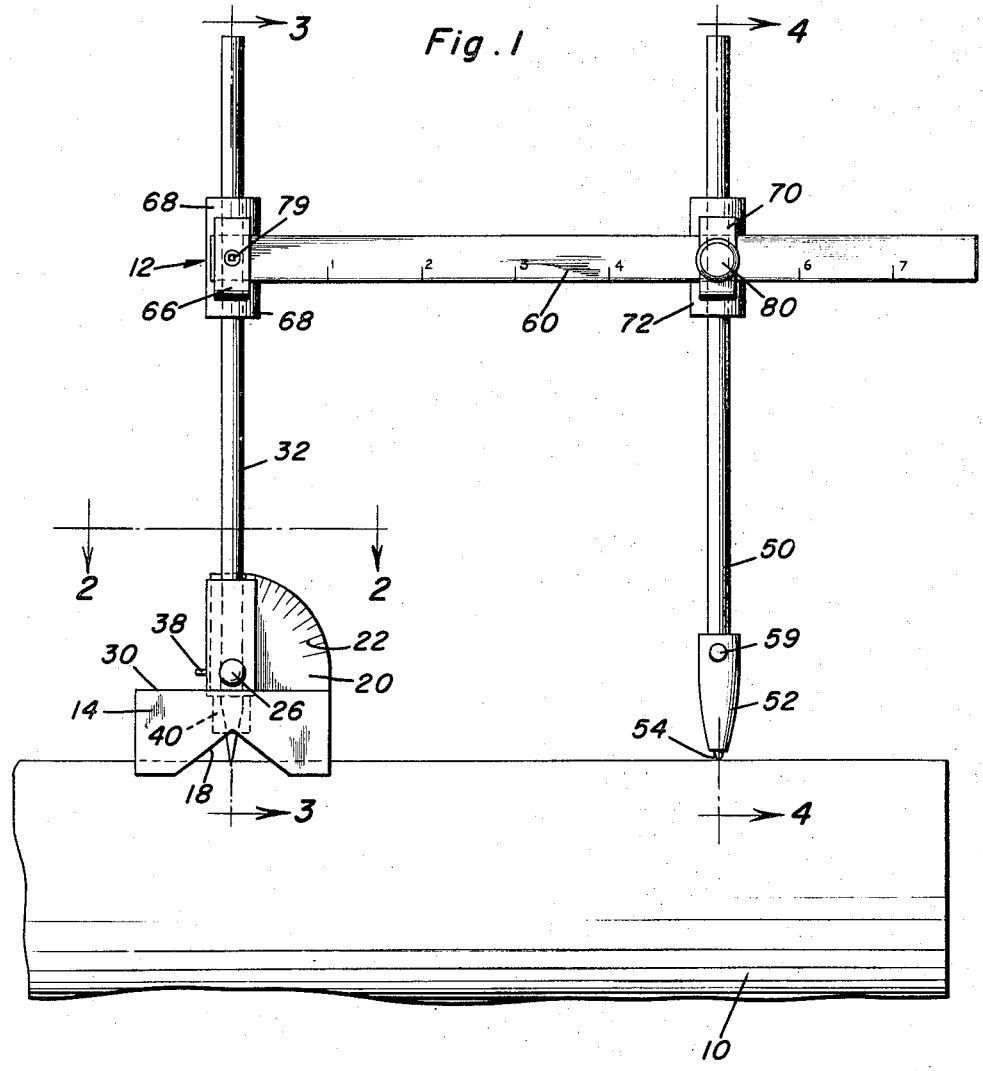
Figure 1 is an elevational view of a device made in accordance with the principles of the invention, showing it applied to a rather large diameter pipe.

In the accompanying drawings I have illustrated one form of my invention and have shown it in use in connection with a typical pipe 10 of rather large diameter. Smaller diameter or larger diameter pipes may be the subject on which the marking device 12 is used. In addition the marking device may be used in connection with other curved surfaces that are not conduits nor pipes.

The marking device 12 consists of a base 14 that has downwardly opening V-shaped notches 16 and 18 that are arranged at right angles to each other. These V-shaped notches form saddles for receiving at least in part the surface of the pipe that is to be scribed. The adoption of the intersecting V-shaped notches 16 and 18 makes possible the use of the brace on various diameter pipes or various curvatures of surfaces without the necessity of setscrews or other levelling devices. Bracket 20 rises from the top of base 14 and has protractor markings 22 thereon. Opening 24 extends through the bracket 20 and is adapted to accommodate a pivot bolt 26 above central opening 28 in the top 30 of base 14.

Figure 2:
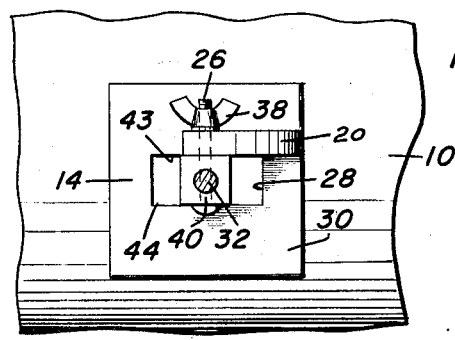
Figure 2 is a sectional view taken on the line 2—2 of Figure 1.
Figure 3:
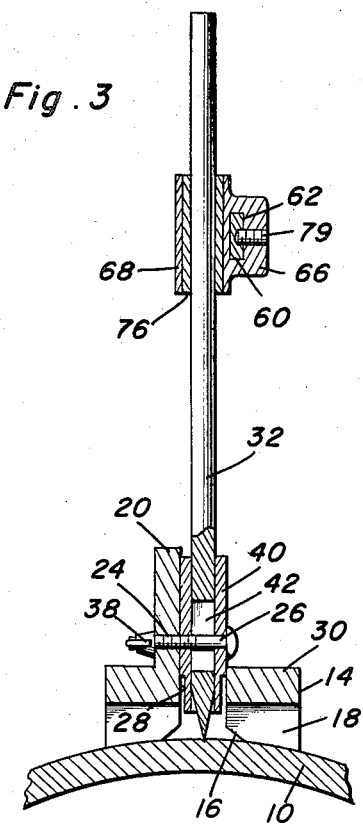
Figure 3 is a sectional view through the first rod constituting a part of the invention and taken on the line 3—3 of Figure 1.

A first rod 32 has its lower end passed through opening 28 and is preferably, but not necessarily, of circular cross section. There are means pivotally and adjustably connecting first rod 32 to base 14, and they include bolt 26 that passes through aperture 24 and that has a wing nut 38 on one end. The opposite end has a head which seats on open ended socket 40 through the bore of which first rod 32 is slidable. The first rod has a slot 42 in it through which bolt 26 passes. Accordingly, the bolt passes through aligned apertures in bracket 20, first rod 32, and socket 40. The socket has parallel side walls that fit flush against side walls 43 and 44 (Figure 2) of opening 28 thereby constraining the pivotal motion of the socket 40 and the first rod 32 which passes through the bore of the socket.

Second rod 50 has at its lower end a holder 52 for the scriber 54. The holder comprises a body that has a bore 56 in which the scriber 54 is frictionally held and fitted together with a counterbore 58 in which the lower extremity of second rod 50 is disposed. Setscrew 59 holds the holder on the lower end of second rod 50.

Bar 60 that is preferably marked in inches, is passed through openings 62 and 64 respectively, the opening 62 being in a block 66 on sleeve 68, while the opening 64 is in a block 70 formed on sleeve 72. Wear resistant bushings 76 and 77 are in sleeves 68 and 72 and these bushings have the first and second rods 32 and 50 slidably passed therethrough. Inasmuch as the cross section of the bar 60 is rectangular, the openings 62 and 64 are preferably rectangular so as to prevent rotary movement of the sleeves with respect to the bar 60.

Figure 4:
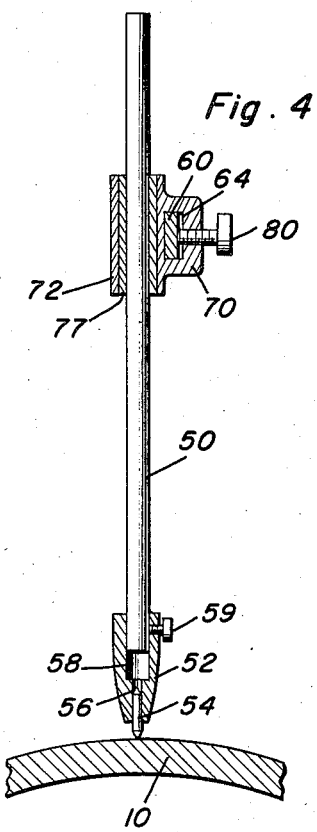
Figure 4 is a sectional view through the second rod and taken approximately on the line 4—4 of Figure 1.
Figure 5:
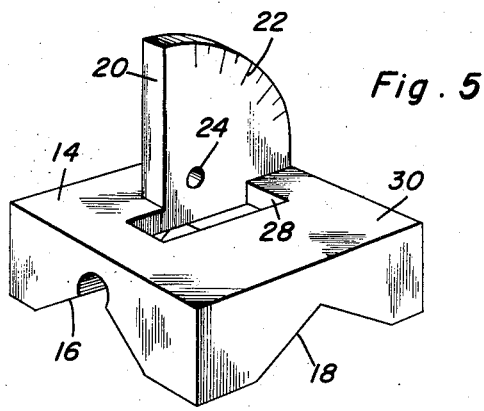
Figure 5 is a perspective view of the base which constitutes a part of the invention.

One end of the bar 60 is fixed, as by setscrew 79, while the other end is adjustably arranged with respect to the other sleeve (Figure 4). In order to hold an adjustment, once selected, setscrew 80 threaded in block 70 and entering opening 64, is used.

In use a center hole or mark is made in the surface that is to be scribed. The lower pointed end of first rod 32 is placed in this hole or impression in the surface of the pipe. The pipe diameter is selected by moving the second rod 50 on bar 60 and by tightening setscrew 80. Then if the pipe is to be marked at an angle, that angularity is selected by loosening wing nut 38 and tilting first rod 32 to the desired angular position at the same time permitting the base 14 to slide very slightly on the pipe 10 whereby the center impression or hole in the pipe 10 continues to retain the pointed end of the first rod 32. Thereafter the second rod 50 is swung to make the desired marking on the pipe, the first sleeve together with the bar 60 being free to slide up and down on the first and second rods.

Where a branch pipe is to be joined to a header, the marking device 12 is placed near the end of the pipe that is to be attached to the header. The marking device is then set by moving the second rod 50 to a numerical position designated by bar 60 which is the same as the header pipe diameter. Then the second rod is swung so that the scriber marks the pipe with the exact curve to enter properly the header.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a pipe marking device, the combination of a first rod and a second rod, a base having an opening in it and adapted to seat upon a pipe which is to be marked, said opening having straight sides that are parallel to each other, means at the lower end of said rod and having straight sides contacting the first mentioned straight sides to constrain the movement of said first rod, pivot bolt connecting the last mentioned means to said base so that the movement of said first rod is constrained to pivotal, a second rod, a holder for a scriber at the lower end of said second rod, a graduated bar, a pair of sleeves freely slidable on said first and second rods, means securing said graduated bar to one of said sleeves, means adjustably securing said graduated bar to the other of said sleeves so that said second rod is adjustable with respect to said first rod and on said graduated bar.

2. The combination of claim 1 wherein said sleeves have bushings that contact said first and second rods, said sleeves having openings of non-circular cross section, said graduated bar being of cross sectional shape and disposed in said non-circular openings.

3. The combination of claim 2 wherein said base has a plurality of intersecting notches for selectively accommodating different diameter pipes.

References Cited in the file of this patent

UNITED STATES PATENTS

| | | |
|---|---|---|
| 948,523 | Perkins | Feb. 8, 1910 |
| 2,460,826 | Hooser | Feb. 8, 1949 |
| 2,659,972 | Norris | Nov. 24, 1952 |
| 2,677,181 | Sury | May 4, 1954 |
| 2,729,891 | Winter | Jan. 10, 1956 |